May 28, 1968 — W. J. CHANCELLOR — 3,385,242
METHOD OF AND APPARATUS FOR PLANTING SEEDS
Filed Sept. 8, 1966
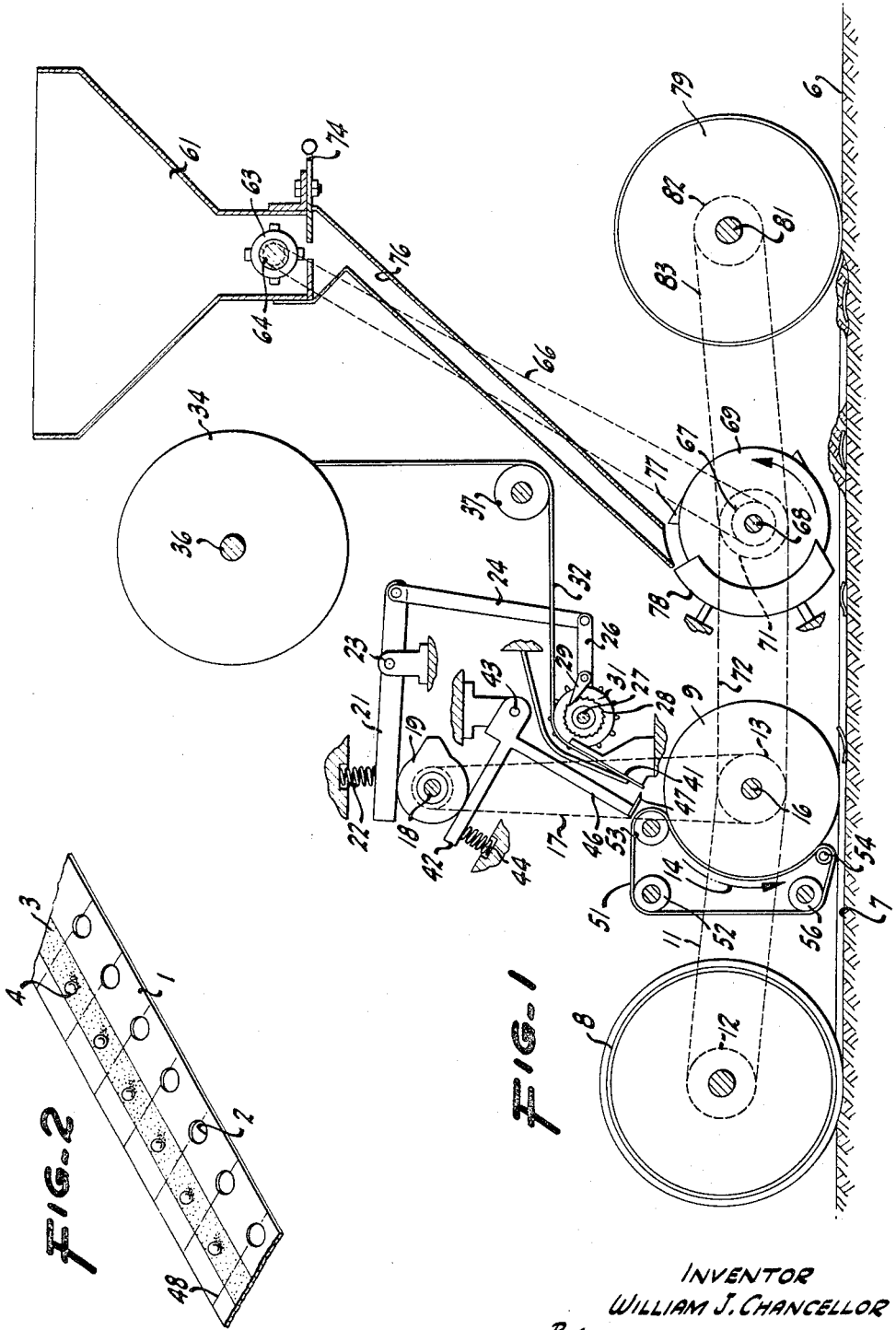
INVENTOR
WILLIAM J. CHANCELLOR
BY Lothrop & West
ATTORNEYS

United States Patent Office 3,385,242
Patented May 28, 1968

3,385,242
METHOD OF AND APPARATUS FOR
PLANTING SEEDS
William J. Chancellor, Davis, Calif., assignor to The
Regents of the University of California, Berkeley,
Calif.
Filed Sept. 8, 1966, Ser. No. 577,855
2 Claims. (Cl. 111—1)

ABSTRACT OF THE DISCLOSURE

A planting machine advances over the ground and at timed intervals feeds a perforated tape, bearing seeds spaced like the perforations, to a severing device that cuts off a tape section having one seed. A conveyor engages the severed section and releases it to fall upon the ground. Covering material carried on the machine is placed over the section on the ground.

My invention has to do with a way of planting seeds in a particular location with respect to each other. In the culture of certain crops; for example, lettuce or sugar beets, it is desired to plant the seeds in such a fashion that each individual seed will be well spaced from the others. This avoids a subsequent thinning step necessary when seeds are planted virtually at random in a row. To space the seeds properly I have in a companion application, Ser. No. 578,087, filed Sept. 8, 1966, and entitled "Method of and Apparatus for Singling Seeds for Planting," disclosed a method of and means for providing individual seeds properly spaced apart and adhesively secured to a continuous tape. The tape holds the individual seeds in spaced location during storage and shipment and retains the seeds in pre-selected relative positions readily available for subsequent planting.

It is therefore an object of this invention to provide a machine for utilizing a tape that carries a succession of single seeds and for planting the seeds at selected locations in the ground.

Another object of my invention is to provide a machine suitable for severing a continuous tape into individual components each bearing one seed for planting.

A further object of the invention is to provide a seed planter which operates with seeds held on a tape.

Another object of the invention is to provide an improved seed planter and method of planting seeds.

Other objects of the invention, together with the foregoing, are attained in the embodiment of the invention shown in the accompanying drawing, in which:

FIGURE 1 is a diagrammatic or schematic illustration of the important parts of a machine construction pursuant to the invention and shown as it is in operation in a field; and FIGURE 2 is an isometric perspective view of a section of tape with which the machine of FIGURE 1 operates.

The provision of a tape with seeds especially located on it is disclosed in detail in the above-identified application. In general, the seed tape 1 is a flexible band or strip of any suitable material which can be stored for a protracted time and which is non-deleterious if left in the ground. The tape 1 is provided with a number of evenly spaced perforations 2 arranged in a row near one edge. It also has an adhesive band 3 or stripe running longitudinally near the center. Individual seeds 4 are secured at appropriate and approximately equal intervals lengthwise of the tape and each preferably has a standard position relative to an adjacent one of the perforations.

My machine for utilizing the tape is designed to be advanced in a field 6 in which a furrow 7 is made by a leading wheel 8 at the front of the machine. The machine is illustrated without any frame mechanism and diagrammatically for clarity of disclosure, and it is to be assumed that the customary draft frame is supplied so that the machine can be advanced in the field behind a tractor. Behind the wheel 8 the device includes a planting wheel 9 connected to the leading ground-engaging wheel 8 by a suitable chain 11 trained around sprockets 12 and 13. As the machine advances, the planter wheel 9 is consequently rotated in the direction of the arrow 14.

On the shaft 16 of the planter wheel a sprocket similar to the sprocket 13 engages a chain 17 to rotate a cam shaft 18 carrying a cam 19. As the machine advances, the cam 19 rotates. A rocker lever 21 is urged against the cam by a spring 22. The rocker lever oscillates about a pivot 23 and is connected by a link 24 to a pawl lever 26 rotatble about a shaft 27. A ratchet wheel 28 is fixed on the shaft 27 and is engaged by a pawl 29 on the pawl lever 26. A sprocket wheel 31 is also fixed on the shaft 27 in position to be engaged by a tape 32. A reel 34 carrying the tape is appropriately mounted on a reel shaft 36 and passes around an idler 37 and thence around the sprocket wheel 31. As the machine advances and the cam 19 rotates, the lever 21 is oscillated and the sprocket wheel 31 is intermittently advanced to feed the tape 32 onto a shear plate 41.

The cam 19 in rotating not only oscillates the lever 21 but likewise oscillates a bell crank lever 42 about a shaft 43, the crank lever 42 being held against the cam by a spring 44. The bell crank lever 42 on its other arm 46 carries a transverse blade 47 designed to oscillate in immediate juxtaposition with the shear plate 41. As the machine advances, not only is the tape 32 advanced in steps, but likewise the blade 47 is oscillated in synchronism with the feeding of the tape and cuts off a predetermined length of tape at appropriate intervals, this action occurring at a severing station substantially above the ground. The cuts are represented by the transverse broken lines 48 in FIGURE 2 and preferably occur about at the center of the successive perforations 2 and about half way between the successive seeds 4.

A severed individual section of tape bearing a single seed falls onto a conveyor including the planter wheel 9 and is rotated therewith in a counterclockwise direction as seen in FIGURE 1. Included in the conveyor and to assist in holding the tape-supported seed against the periphery of the planter wheel for a portion of its rotation a holding belt 51 is trained around appropriate guide rollers 52, 53, 54 and 56. The effect of this mechanism is to provide a converging throat at the severing station to engage and ensure the transfer of the severed seed-bearing tape section around the forward portion of the periphery of the planter wheel. The belt at a second station just above the ground diverges from the planter wheel 9 and so defines a diverging outlet for releasing the severed tape section. The conveyor including the wheel 9 and the belt 51 deposits the tape section on the ground in the furrow 7 just in advance of the planter wheel 9. The timing is such that the deposited tape sections are farther apart on the ground than they were in the tape itself.

The deposited sections of tape are overridden by a mechanism for depositing a covering thereon. A hopper 61 on the frame is provided with an agitating drum 63 rotatable with a shaft 64. A chain 66 connects the agitator shaft with a suitable sprocket 67 on a shaft 68 of a deposit wheel 69. The shaft 68 carries a sprocket 71 linked by a chain 72 with the sprocket 13. The deposit wheel and the agitator drum 63 are both rotated as the device advances. At the bottom of the hopper 61 beneath the agitator there is an adjustable gate 74 which can be set to pass any regulated amount of the covering material contained in the hopper 61.

The material released from the hopper travels down a chute 76 to a position just above the top of the deposit wheel. Projections 77 on the deposit wheel enter the lower portion of the chute and assist in advancing segments of the covering material through a guard channel 78 supported on the main frame and extending around the deposit wheel to a point near the ground. The timing of the machine is such that each deposited tape section with its seed thereon is promptly covered by a mound of the covering material. Behind the deposit wheel there is provided a cover wheel 79 fixed on a shaft 81 carrying a sprocket 82 driven by a chain 83 from a sprocket beside the sprocket 71. The cover wheel follows along and flattens and smooths down the individual mounds so that the field surface is left with the seed tape sections well covered and ready for germination of the seeds in the respective, carefully spaced locations.

The material used for covering can be a portion of the original soil or can be a material containing various additives effective to assist in the germination and growth of the seed. Also, the covering material may be helpful in accelerating the disintegration of the tape sections.

What is claimed is:

1. An apparatus for planting seeds comprising a machine adapted to be advanced over the ground, means on said machine for advancing a continuous tape having single seeds spaced thereon, means at a first station substantially spaced above the ground for severing from said tape a section having a seed thereon, means forming a substantially closed conveyor extending between said first station and a second station just above the ground, said conveyor having a converging throat for engaging said section at said first station and having a diverging outlet for releasing said section at said second station, and means for operating said advancing means and said severing means in synchronism.

2. A device as in claim 1 including means on said machine for carrying a supply of covering material, and means for depositing covering material from said supply onto said sections on the ground.

References Cited

UNITED STATES PATENTS

| | | | |
|---|---|---|---|
| 3,059,437 | 10/1962 | Jennings et al. | 61—72.6 |
| 3,065,605 | 11/1962 | Zitko | 61—72.6 |
| 3,294,045 | 12/1966 | Kelley et al. | 111—1 |
| 3,331,532 | 7/1967 | Hori | 47—56 XR |

ROBERT E. BAGWILL, *Primary Examiner.*